(12) United States Patent
Rosenbalm et al.

(10) Patent No.: US 7,059,108 B1
(45) Date of Patent: Jun. 13, 2006

(54) CROP DEFLECTOR USED WITH CROP CONDITIONER ROLLS FOR EFFECTING FORMATION OF FLUFFY WINDROW

(75) Inventors: Allan Wesley Rosenbalm, Blakesburg, IA (US); Jason Chad Eubanks, Hedrick, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/094,043

(22) Filed: Mar. 30, 2005

(51) Int. Cl.
*A01D 61/00* (2006.01)

(52) U.S. Cl. .................................. 56/16.4 R

(58) Field of Classification Search ............ 56/16.4 R, 56/153, 189, 191, 192, DIG. 21
See application file for complete search history.

(56) References Cited

U.S. PATENT DOCUMENTS

| | | | |
|---|---|---|---|
| 3,241,300 A * | 3/1966 | Fell et al. ............... | 56/153 |
| 3,543,491 A * | 12/1970 | Lausch .................... | 56/192 |
| 3,680,290 A * | 8/1972 | Laverne .................... | 56/1 |
| 3,721,073 A * | 3/1973 | Scarnato ................ | 56/16.4 B |
| 4,099,364 A | 7/1978 | Kanengieter et al. | |
| 4,217,746 A * | 8/1980 | Cicci et al. ............. | 56/14.7 |
| 4,385,484 A * | 5/1983 | Ehrhart et al. ......... | 56/320.1 |
| 5,930,988 A * | 8/1999 | Hanson ................... | 56/16.4 A |
| 6,158,201 A | 12/2000 | Pruitt et al. | |
| 6,854,251 B1 | 2/2005 | Snider | |
| 2003/0121243 A1 * | 7/2003 | Carlot et al. ............. | 56/153 |
| 2004/0079062 A1 | 4/2004 | Kraus et al. | |

* cited by examiner

*Primary Examiner*—Árpád Fábián Kovács

(57) ABSTRACT

A mower-conditioner includes a pair of conditioner rolls oriented for feeding crop along a flight path extending upwardly toward an impact surface of a swath forming shield. A crop deflector includes a panel disposed so as to intersect the flight path at a location between the conditioner rolls and the impact surface of the swath forming shield so as to cause the crop to follow a steeper path so that it impacts the forming shield with greater impact than it would otherwise, which causes the crop to fall in a random orientation so as to form a fluffy windrow.

5 Claims, 1 Drawing Sheet

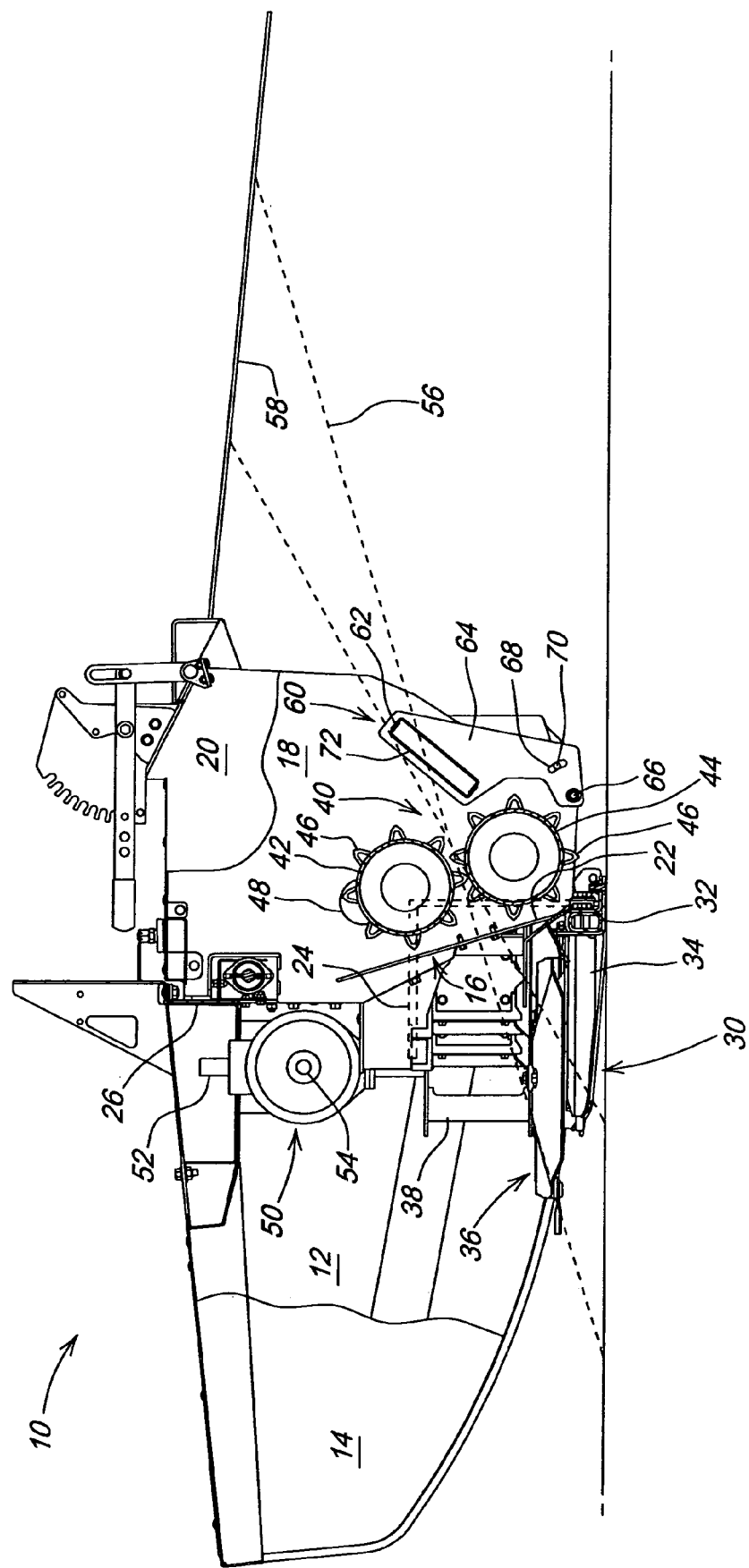

CROP DEFLECTOR USED WITH CROP CONDITIONER ROLLS FOR EFFECTING FORMATION OF FLUFFY WINDROW

FIELD OF THE INVENTION

The present invention relates to mower-conditioners equipped with conditioner rolls, and more specifically relates to an attachment used with such mower-conditioners for forming a fluffy windrow

BACKGROUND OF THE INVENTION

Modern mower-conditioners are powered so that they may be towed at a relatively fast speed over the field. Due to the increased ground speed, the crop windrow is left flat with the crop stems oriented parallel with the direction of travel. The flat windrow seals the crop on the bottom from any air to dry the crop.

The problem to be solved is that of forming a windrow that will dry down in a relatively short time without requiring the ground speed of the mower-conditioner to be slowed below the cutting and windrow forming capacity of the mower-conditioner.

SUMMARY OF THE INVENTION

According to the present invention, there is provided a mower-conditioner having an improved windrow-forming structure.

An object of the invention is to provide a mower-conditioner having a structure for altering the flight path of the crop passing through the conditioning rolls in such a way that the crop contacts the windrow forming shield at an angle conducive for forming a fluffy windrow.

This and other objects of the invention will become apparent from a reading of the ensuing description together with the appended drawing.

BRIEF DESCRIPTION OF THE DRAWINGS

The sole FIGURE is a left side elevational view of a mower-conditioner platform equipped with a roll conditioner, with parts removed or broken away for clarity, and embodying the crop deflecting structure of the present invention.

DESCRIPTION OF THE PREFERRED EMBODIMENT

Referring to the drawing, there is shown a mower-conditioner platform or header 10 including a body defined by right- and left-hand, transversely spaced, vertical side walls 12 and 14, respectively. Right- and left-hand, upright transverse walls or bulkheads 16 extend inwardly from the side walls 12 and 14 and are respectively joined to, and terminate at forward ends of transversely spaced, vertical, right- and left-hand inner side walls 18 and 20, which define a crop discharge passage between them. While the bulkheads 14 could be of various upright configurations, as here shown, each includes a vertical lower rear section 22, an intermediate horizontal section 24 and a vertical upper front section 26.

An elongate rotary cutter bar 30 extends between the side walls 12 and 14. A rear part of the cutter bar 30 is defined by an elongate stiffener beam 32 that is mounted to a rear surface of a gear housing 34 of the cutter bar 30, and to a forward surface of the lower bulkhead sections 22. While the present invention could be advantageously applied to rotary cutter bars of various constructions, the cutter bar 30 is a known type wherein the gear housing 34 contains a plurality of intermeshed spur gears (not shown) including idler and drive gears, coupled for effecting rotation of respective drive shafts of a plurality of cutting units spaced along the length of the cutter bar 30, with a left-hand end cutting unit 36 being shown. The various cutting units located at opposite sides of the discharge opening defined between the inner side walls 18 and 20 are driven in opposite directions so that crop is converged into a stream that passes between the inner side walls together with the crop cut in forward alignment with the discharge opening. To aid in this convergence of crop, an end converging drum 38 is mounted for rotation with the end cutting unit 36 and with the end cuffing unit at the opposite end of the cutter bar 30. Additional converging drums (not shown) are provided inwardly of the end converging drums and to the rear of the centerline of the cutting units, and provided with a drive separate from that for the cutting units.

Located between the side walls 18 and 20 for receiving and conditioning the crop delivered to it by the cooperative action of the cutter bar 30 and converging drums is a roll type crop conditioner 40 comprising upper and lower conditioner rolls 42 and 44, respectively. While the conditioner rolls 42 and 44 could be provided with any desired conditioner surface, as here shown, each includes a plurality of straight ribs 46 which extend the length of the roll and are spaced equidistant about the periphery of the rolls. The lower conditioner roll 44 may be provided with stub shafts at its opposite ends (not shown) which are mounted within bearings fixed to the walls 18 and 20, with it being noted that the lower roll 44 is positioned such that a cylindrical path traced by the tips of the ribs 46 includes a lower portion that passes just to the rear of a central portion of the stiffener beam 32 that bridges the discharge opening. The upper conditioner roll 42 is displaced a short distance forward of the lower roll 44, and with the upper and lower rolls 42 and 44 so located, crop delivered by the cutter bar 30 and the converging drum arrangement will be positively fed into engagement with the rolls 42 and 44, without any need for a secondary feeding element as would be necessary if the rolls were spaced further to the rear. Opposite ends of the upper conditioner roll may also be provided with respective stub shafts, with these projecting through respective arcuate clearance slots 48 provided in the side walls 18 and 20. These stub shafts are rotatably mounted in bearings carried by respective arms (not shown) so that the upper roll 42 may swing vertically relative to the lower roll 44 in response to crop passing between the rolls 42 and 44.

Power for driving the cutting units of the cutter bar 30 and the upper and lower conditioner rolls is distributed from a main power distribution gear box 50 located vertically above the left-hand cutting unit 36. The gear box 50 contains right angle gearing, with a first shaft 52 extending through the gear box 50 from top to bottom and being adapted for having a hydraulic drive motor or other source of power coupled to its upper end and having a drive shaft of the left-hand cutting unit coupled to its lower end. Thus, power flow for the cutter bar 30 starts at the drive shaft of the left cutting unit 36 and goes to the other end of the gear housing 34 by way of the intermeshed idler and drive gears. A second shaft 54 is disposed at a right angle to the first shaft 52 and projects leftward from the gear box 50 and power for driving the conditioner rolls 42 and 44 is delivered to the shaft 54 by way of a bevel gear set (not shown). For the sake of simplicity, a gear housing having parallel output shafts respectively coupled to the conditioner rolls 42 and 44 by respective power shafts is not shown here, this gear housing including an input shaft carrying a belt pulley arrangement that is coupled for being driven from a similar belt pulley arrangement mounted to the second shaft 54 of the gear box 50.

In any event, the conditioner rolls 42 and 44 are counter-rotated so as to deliver crop between them along a flight path 56 that extends perpendicular to the line of centers of the rolls 42 and 44 and intersects a bottom surface of a swath forming shield 58, extending rearwardly from an upper rear region of the frame 12. The flight path 56 makes an angle of approximately 21° with the swath forming shield 58.

It has been found that crop striking the swath forming shield 58 at such an angle will result in the stems of crop becoming oriented in the direction of travel such that the resulting windrow is relatively flat, with the bottom of the windrow being somewhat sealed from any air to dry the crop.

The present invention was developed to overcome the aforementioned drying problem and includes a crop deflector 60 constructed of a flat panel 62 having opposite ends respectively fixed, as by welding, to a pair of vertical legs 64. The pair of legs 64 are respectively disposed against inner surfaces of the walls 18 and 20, and are attached to these walls by respective pivot bolts 66 establishing a horizontal, transverse axis about which the legs 64 may pivot. Each of the legs 64 includes an adjustment slot 68 formed at a radius about the axis defined by the pivot bolts 66. A bolt 70 projects through a hole provided in each of the side walls 18 and 20, and is received in a respective slot 68. A nut (not shown) is received on each bolt 70 and is tightened so as to retain the crop deflector 60 is a selected position for disposing the panel 62 in a desired angular disposition relative to the flight path 56. As shown here, an upper surface 72 of the panel 62 intersects, and makes an obtuse angle of approximately 145° with the flight path 56 so that conditioned crop is deflected upwardly relative to the flight path 56 and impacts the swath forming shield 58 at an angle of at least 33°, resulting in a relatively hard impact of the crop with the forming shield so that the crop is spread out evenly and forms a fluffy windrow which has good drying characteristics.

Having described the preferred embodiment, it will become apparent that various modifications can be made without departing from the scope of the invention as defined in the accompanying claims.

The invention claimed is:

1. In a crop conditioner including upper and lower conditioner rolls extending transversely between and being mounted to opposite side walls, with said upper conditioner roll having a rotation axis located above and forward of a rotation axis of said lower conditioner roll, and with said upper and lower conditioner rolls being mounted for receiving crop between them and feeding the crop along an upwardly and rearwardly directed flight path extending perpendicular to a line of centers of said conditioner rolls, and a swath forming shield intersecting said flight path at a location spaced rearward of, and at a height above, said conditioner rolls, the improvement comprising; a crop deflector including a deflector surface extending co-extensive with said upper and lower conditioner rolls and intersecting said flight path at a location between said conditioner rolls and said swath forming shield; and said deflector surface being so disposed relative to said flight path that crop is deflected upward relative to said flight path.

2. The crop conditioner, as defined in claim 1, wherein said crop deflector is adjustable so as to dispose said deflector surface at various angular dispositions relative to said flight path.

3. The crop conditioner, as defined in claim 1, wherein said crop deflector is defined by a panel having parallel upper and lower surfaces, with said upper surface being said deflector surface.

4. The crop conditioner, as defined in claim 1, wherein said crop deflector includes opposite legs respectively mounted to said opposite side walls, and a transverse member extending between and joined to said opposite side walls and including said deflector surface.

5. The crop conditioner, as defined in claim 4, wherein said legs are mounted to said opposite side walls for pivoting about a horizontal transverse axis; and a fixing structure being provided for releasably fixing said legs in a desired position about said horizontal axis to thereby dispose said deflector surface at a selected attitude relative to said flight path.

* * * * *